United States Patent

Yoon et al.

Patent Number: 5,342,416
Date of Patent: Aug. 30, 1994

[54] BLUE DYE COMPOSITION

[75] Inventors: Chun Yoon; Han-Chul Song; Tae-Gab Kwon, all of Daejeon, Rep. of Korea

[73] Assignee: Lucky Limited, Seoul, Rep. of Korea

[21] Appl. No.: 997,228

[22] Filed: Dec. 28, 1992

[30] Foreign Application Priority Data

Feb. 18, 1992 [KR] Rep. of Korea .................. 92-2388

[51] Int. Cl.$^5$ ............................................. C09B 29/00
[52] U.S. Cl. ............................................. 8/639; 8/662; 8/922
[58] Field of Search .................. 8/639, 696, 921, 922, 8/924, 622; 534/573

[56] References Cited

U.S. PATENT DOCUMENTS

| | | | |
|---|---|---|---|
| 4,386,934 | 7/1983 | Bergmann et al. | 8/639 |
| 4,389,216 | 7/1983 | Bergmann et al. | 8/639 |
| 4,401,692 | 8/1983 | Schickfluss et al. | 8/639 |
| 4,486,198 | 12/1984 | Becker et al. | 8/639 |
| 4,494,957 | 1/1985 | Niwa et al. | 8/639 |
| 4,523,926 | 7/1985 | Brandt et al. | 8/639 |
| 4,678,476 | 7/1987 | Tappe et al. | 8/639 |
| 4,728,338 | 3/1988 | Henzi | 8/639 |
| 4,851,012 | 7/1989 | Bühler et al. | 8/639 |
| 5,071,443 | 12/1991 | Bühler et al. | 8/639 |
| 5,160,348 | 11/1992 | Hoppe et al. | 8/524 |

FOREIGN PATENT DOCUMENTS

| | | |
|---|---|---|
| 3821388 | 6/1988 | Fed. Rep. of Germany . |
| 3906189 | 8/1990 | Fed. Rep. of Germany . |
| 38-23286 | 11/1963 | Japan . |
| 90316742 | 7/1983 | Japan . |
| 1297467 | 11/1989 | Japan . |

*Primary Examiner*—Paul Lieberman
*Assistant Examiner*—Margaret Einsmann
*Attorney, Agent, or Firm*—James D. Hall

[57] ABSTRACT

The present invention provides a blue dye composition having excellent percentage of exhaustion which comprises a compound of formula(I) and a compound of formula(II):

wherein
each of said R's, which may be the same or different, represents a $C_{1-4}$ alkyl group.

2 Claims, No Drawings

BLUE DYE COMPOSITION

FIELD OF THE INVENTION

The present invention relates to a blue dye composition useful in coloring synthetic fibers such as polyesters; and, more particularly, to a bright blue dye composition which comprises a compound of formula (I) and a compound of formula (II):

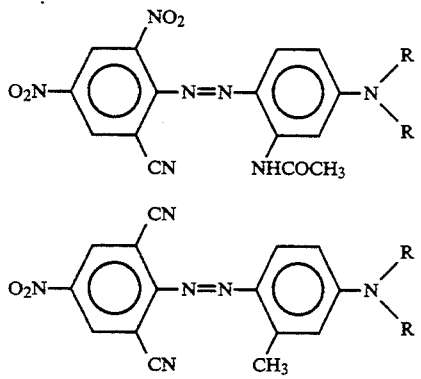

wherein
each of said R's, which may be the same or different, represents a $C_{1-4}$ alkyl group.

BACKGROUND OF THE INVENTION

Conventional anthraquinone blue dyes such as C. I. Disp. Blue 56 have been used to dye polyesters for a long time. However, they have several deficiencies such as: low hue intensity which incurrs extra costs for the dyeing process; tendency to easily contaminate other fibers than those to be dyed; likelihood of uneven dyeing; and, particularly, they are complexed with a metalic ion to form a metalic salt.

DE 3,821,338 Al discloses an improved blue dye composition which comprises the compounds of formulae (A), (B), (C) and (D):

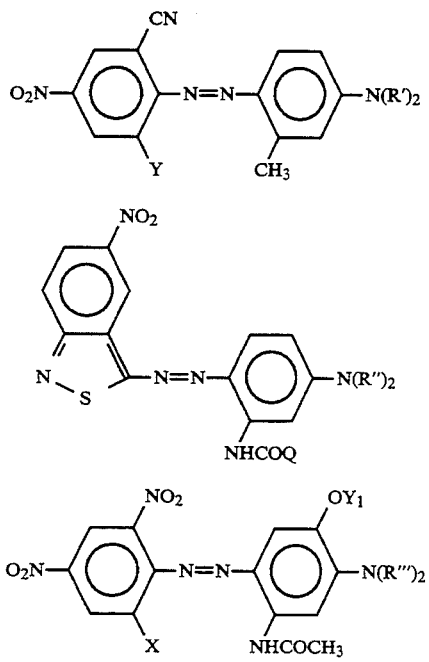

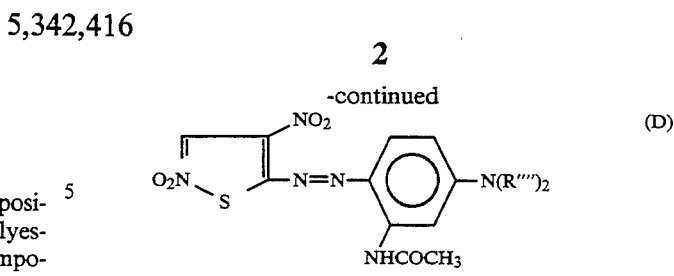

wherein
R', R", R''' and R'''' respectively represent an alkyl, arylalkyl, alkoxyalkyl, hydroxyalkyl, chloroalkyl or alkenyl group;
X represents Cl or Br;
Y represents a cyano or nitro group;
$Y_1$ represents an alkyl, arylalkyl or alkoxyalkyl group; and
Q represents an alkyl, aryl or alkoxy group.

The dye composition disclosed in the above German patent application, while successful in improving some of the above-mentioned disadvantages, still possesses various defects. For instance, release of the dye may occur during a continuous, high temperature dyeing process; the degree of exhaustion tends to be low; discoloration may occur during the permanent setting and ironing process of polyesters; and wash fastness is also poor. Further, in the process of dyeing a polyester and cotton fiber blend, the contamination is relatively high, and, therefore, the inherent color does not appear sufficiently after the completion of dyeing the blend, which may require another step of reducing/cleaning process employing a strongly toxic material.

In addition, the dye composition of the above-mentioned German patent application comprises a component having an alkoxy group (which is hydrophilic); accordingly, affinity of the dye with polyester (which is hydrophobic) is low, resulting in a substantial loss of the dye.

SUMMARY OF THE INVENTION

The present inventors have made continuous efforts to develop a novel dye composition with improved characteristics such as: excellent degree of exhaustion during various dyeing processes including a high concentration dyeing process; superior fastnesses; and bright color.

It is, therefore, an object of the present invention to provide a blue dye composition which comprises a compound of formula (I) and a compound of formula (II):

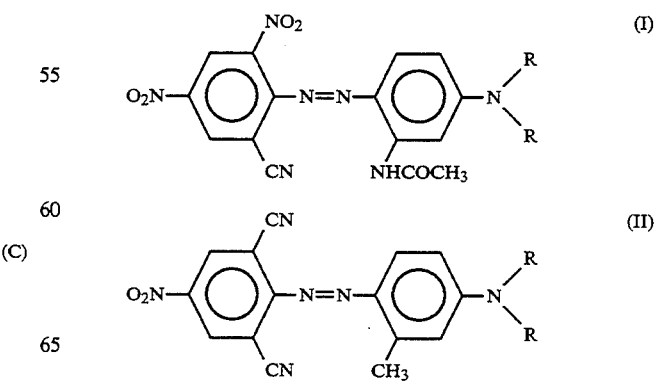

wherein each of said R's, which may be the same or different, represents a C$_{1-4}$ alkyl group.

It is another object of the present invention to provide a blue dye composition which comprises the compounds of the above formulae (I) and (II) and at least one of the compounds of formulae (III), (IV) and (V):

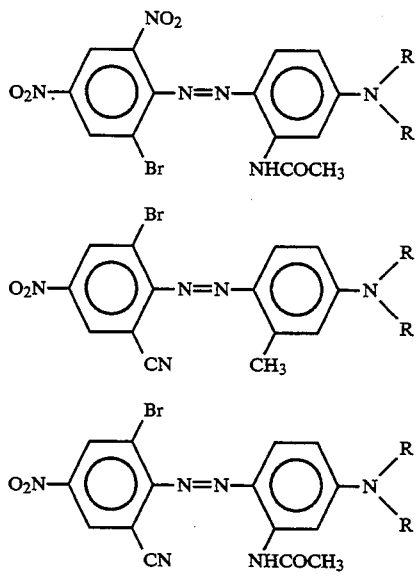

wherein R is the same as previously defined.

DETAILED DESCRIPTION OF THE INVENTION

The compounds of formulae (I), (II), (III), (IV) and (V), which may be used as the main components in the dye composition of the present invention, are well known. The compound of formula (III) has a redish-blue color and a strong hue intensity and, therefore, has the ability to make the color dyed to be distinct even with a small amount. The compound of formula (I) has a light greenish-blue color as well as a strong hue intensity, and can be obtained by cyanizing the compound of formula (III) in the presence of ZnCl$_2$ and a cuprous or cupric catalyst in dimethylformamide (DMF) as its solvent (yield 85%). The compound of formula (II) has a light redish-blue color and brightens the hue of the dye composition, and can be obtained by cyanizing the compound of formula (IV) in the presence of ZnCl$_2$ and a cuprous or cupric catalyst in DMF as its solvent (yield 80%). The compound of formula (IV) has a strong redish-blue color, a bright and intense hue, and can be obtained by coupling N,N-dialkylmetatoluidine to a diazo derivative of bromocyanonitroaniline (yield 95%). The compound of formula (V) has a light redish-blue color, a bright and intense hue, and excellent color fastness against sublimation (AATCC, 117 to 1989, at 200° C. and for 30 seconds; stain level on polyester: grade 3) so that it services to increase the color fastness against sublimation of the dye composition.

The dye composition of the present invention can be obtained simply by blending the compounds of formulae (I) and (II) and, optionally, with at least one of the compounds of formulae (III), (IV) and (V) or by forming a mixed crystal thereof. The blending ratio may be suitably varied according to the desired color or intensity of the color. To exhibit a conventional light blue color, the dye composition may comprise 20 to 80 wt % of the compound of formula (I), 10 to 60 wt % of the compound of formula (II), 0 to 20 wt % of the compound of formula (III), 0 to 10 wt % of the compound of formula (IV) and 0 to 5 wt % of the compound of formula (V), based on the total weight of the composition. Preferably, the dye composition may comprise 40 to 70 wt % of the compound of formula (I), 20 to 50 wt % of the compound of formula (II), 3 to 15 wt % of the compound of formula (III), 2 to 5 wt % of the compound of formula (IV) and 0 to 3 wt % of the compound of formula (V), based on the total weight of the composition.

The dye composition of the present invention may comprise a dispersant such as lignin sulfonate and other suitable dispersants for blending with the above-mentioned components or forming a blend crystal thereof.

The blue dye composition of the present invention has several advantages over the dye composition of the prior art: first, the present composition has an excellent color fastness to sublimation so that the release of the dye in a continuous, high temperature dyeing process can be lowered and the discoloration of dyed polyesters can be reduced in permanent setting and ironing process; secondly, the present composition entails a low level of contamination on cotton so that the inherent color of cotton can be maintained in case of dyeing a blended fiber of polyester and cotton; thirdly, the present composition has an improved wash fastness so that upon washing, decoloration of cloth is reduced and, thereby, avoiding the problem of staining or contaminating other clothes washed together; and, finally, the compounds of formulae (I) to (V) used in the dye composition of the present invention have an alkyl group (which is hydrophobic) capable of increasing the hydrophobicity thereof and, therefore, enhancing the affinity with polyester (which is hydrophobic) and lowering the affinity of the dye with cotton, whereby such post treatment as reducing/cleaning can be eliminated after the dyeing of, e.g., cotton-polyester fiber blend.

Accordingly, the present dye composition is highly advantageous for dyeing a cotton-polyester fiber blend as well as for dyeing a synthetic fiber such as polyester and the like.

The following Examples are provided for the purpose of further illustrating the present invention, without limiting the scope of the invention.

EXAMPLE 1

57.5 g of the compound of formula (I) wherein both R's are ethyl, 35 g of the compound of formula (II) wherein both R's are ethyl, 5 g of the compound of formula (III) wherein both R's are ethyl and 2.5 g of the compound of formula (IV) wherein both R's are ethyl were mixed homogeneously. To this mixture were added 100 g of a lignin sulfonate dispersant and 500 g of water to disperse the mixture thoroughly for 2 hours by using a Dynomil mixing and crushing machine.

1 g of the dye composition thus prepared and 50 g of polyester cloth to be dyed were placed at 130° C. for 45 minutes to dye the cloth in a bright blue color. The dyed cloth shows the following characteristics; contamination degree of grades 2 to 3 and discoloration of grade 3, measured on the basis of color fastness to sublimation (AATCC, 117 to 1989, 200° C., 30 seconds); the contamination degree of grade 4 and discoloration of grades 4 to 5, measured on the basis of wash fastness (AATCC 61 to 1989, 3A), respectively; and the contamination degree of grade 5 and discoloration of grade 5, measured on the basis of color fastness to perspiration (AATCC 15 to 1989, acidic). The color produced was bright blue color similar to conventional dye, C. I. disperse No. 56.

EXAMPLE 2

50 g of the compound of formula (I) wherein both R's are ethyl, 35 g of the compound of formula (II) wherein both R's are ethyl, 10 g of the compound of formula (III) wherein both R's are ethyl, 2.5 g of the compound of formula (IV) wherein both R's are ethyl and 2.5 g of the compound of formula (V) wherein both R's are ethyl were mixed homogeneously. To this mixture were added 100 g of a lignin sulfonate dispersant and 500 g of water to disperse the mixture thoroughly for 2 hours by using a Dynomil mixing and crushing machine. 1 g of the dye composition thus prepared and 50 g of polyester cloth to be dyed were placed at 130° C. for 45 minutes to dye the cloth in a bright blue color. The dyed cloth had the fastness and color characteristics similar to the results of Example 1.

EXAMPLE 3

57.5 g of the compound of formula (I) wherein both R's are ethyl, 34 g of the compound of formula (II) wherein both R's are propyl, 3 g of the compound of formula (III) wherein both R's are ethyl, 3.5 g of the compound of formula (IV) wherein both R's are propyl and 2 g of the compound of formula (V) wherein both R's are ethyl were mixed homogeneously. To this mixture were added 100 g of a lignin sulfonate dispersant and 500 g of water to disperse thoroughly for 2 hours by using a Dynomil mixing and crushing machine. 1 g of the dye composition thus prepared and 50 g of polyester cloth to be dyed were placed at 130° C. for 45 minutes to dye the cloth in a bright blue color. The dyed cloth had the fastness and color characteristics similar to the results of Example 1.

EXAMPLE 4

55 g of the compound of formula (I) wherein both R's are ethyl and 45 g of the compound of formula (II) wherein both R's are ethyl were mixed homogenously, To this mixture were added 100 g of a lignin sulfonate dispersant and 500 g of water to disperse thoroughly for 2 hours using by Dynomil mixing and crushing machine. 1 g of the dye composition thus prepared and 50 g of polyester cloth to be dyed were placed at 130° C. for 45 minutes to dye the cloth in a bright blue color. The dyed cloth had the fastness and color characteristics similar to the results of Example 1.

Comparative Example 1

59 g of the compound of formula (A) wherein both (R')'s are ethyl and 41 g of the compound of formula (B) wherein both (R")'s are methoxyethyl (as described previously) were mixed homogeneously. To this mixture were added 100 g of a lignin sulfonate dispersant and 500 g of water to disperse thoroughly for 2 hours by using a Dynomil mixing and crushing machine to obtain a blue dye composition commercially available.

1 g of the dye composition thus prepared and 50 g of polyester cloth to be dyed were placed at 130° C. for 45 minutes to dye the cloth in a bright blue color. The dyed cloth shows the following characteristics: contamination degree of grade 2, measured on the basis of color fastness to sublimation (AATCC, 117 to 1989, 200° C., 30 seconds); and, contamination degree of grade 4 and discoloration grades of 4 to 5, measured on the basis of wash fastness (AATCC 61 to 1989, 3A).

Evaluation of the Degree of Exhaustion

Polyester fibers were dyed by using the dye composition (A) from Example 1 and the dye composition (B) from Comparative Example 1 at 130° C. for 45 minutes with varied amounts of the dyes and the degrees of exhaustion were measured. The results are presented in Table 1.

TABLE 1

| Results of Measurement for the Degree of Exhaustion | | | | | | | |
|---|---|---|---|---|---|---|---|
| Amount (wt %) | | 0.38 | 0.76 | 1.52 | 2.28 | 3.04 | 3.80 |
| Exhaustion Percentage (%) | Composition A | 100 | 100 | 100 | 100 | 99.1 | 98.4 |
| | Composition B | 100 | 100 | 100 | 99.3 | 99 | 97.6 |

As shown in Table 1, the degree of exhaustion of the dye composition of the present invention is higher than that of the dye composition of prior art especially at high concentration ranges.

Evaluation of Contamination Degree of Cotton

A blend of polyester and cotton fibers (50:50) was dyed by using the dye composition (A) from Example 1 and the dye composition (B) from Comparative Example 1 at 130° C. for 45 minutes with varying the amounts of the dyes, and the contamination degree on cotton in the blend was measured. The contamination degree or stain level was defined in terms of AATCC transference scale of grades 1 to 5 and the results are presented in Table 2.

TABLE 2

| Results of Test for Contamination Degree on Cotton | | | | |
|---|---|---|---|---|
| Amount (wt %) | | 0.38 | 0.76 | 1.14 |
| Stain Level (grade) | Composition A | 4–5 | 4–5 | 4–5 |
| | Composition B | 4–5 | 4 | 3–4 |

As shown in Table 2, the dye composition of the present invention contaminates cotton fibers less than the dye composition of prior art, particularly in dyeing at a high concentration range.

While the invention has been described in connection with the above specific embodiments, it should be recognized that various modifications and changes as may be apparent to those skilled in the art to which the invention pertains may be made and also fall within the scope of the invention as defined by the claims that follow.

What is claimed is:

1. A blue dye composition which comprises 40 to 70 wt % of a compound of formula (I), 20 to 50 wt % of a compound of formula (II), 3 to 15 wt % of a compound of formula (III), 2 to 5 wt % of a compound of (IV) and 0 to 3 wt % of a compound of formula (V):

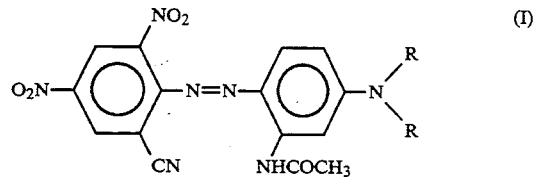

-continued
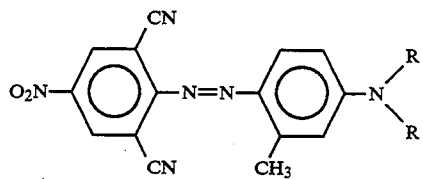
(II)
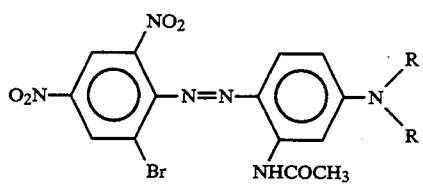
(III)
-continued
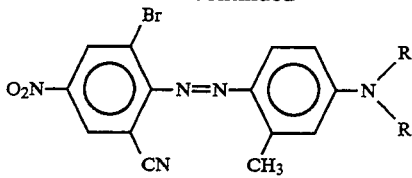
(IV)
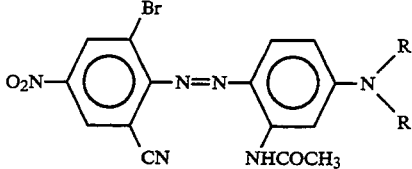
(V)
wherein each of said R's, which may be the same or different, represents a $C_{1-4}$ alkyl group.
2. The dye composition of claim 1 which further comprises a lignin sulfonate dispersant in an amount of 100 parts by weight per 100 parts of the total weight of the compounds of formulae (I) to (V).
* * * * *